United States Patent [19]

Hemmann et al.

[11] 3,964,444
[45] June 22, 1976

[54] CONTROL CIRCUIT FOR AN ELECTROMOTOR

[75] Inventors: Rainer Hemmann, Markgroningen; Helmut Steinmann, Baden-Baden, both of Germany

[73] Assignee: Robert Bosch G.m.b.H., Stuttgart, Germany

[22] Filed: Oct. 15, 1974

[21] Appl. No.: 515,043

[30] Foreign Application Priority Data
Oct. 19, 1973  Germany............................ 2352525

[52] U.S. Cl............................ 123/41.49; 123/41.12; 123/41.65; 180/82 R; 322/33; 200/52 R
[51] Int. Cl.².................................................. F01P 7/10
[58] Field of Search............................ 123/41.15, 123/41.12, 41.01, 41.49, 41.58, 41.63, 41.65, 41.66; 322/33; 180/82 R; 307/10 R; 340/52 R

[56] References Cited
UNITED STATES PATENTS

| | | |
|---|---|---|
| 3,387,598 | 6/1968 | Almenfors ........................ 123/41.15 |
| 3,823,363 | 7/1974 | Hill .................................. 123/41.49 |
| 3,853,098 | 12/1974 | Ishikawa ........................... 123/41.49 |
| 3,894,521 | 7/1975 | Sakasegawa ...................... 123/41.49 |

Primary Examiner—Charles J. Myhre
Assistant Examiner—Daniel J. O'Connor
Attorney, Agent, or Firm—Michael J. Striker

[57] ABSTRACT

A pair of relay contacts directly connect the electromotor to a battery when closed. One side of the relay coil controlling the contacts is connected to a battery when a thermostat responsive to engine temperature closes. The other side of the relay coil is connected to the battery through an electronic switch, in one embodiment a thyristor, in the other a transistor, which are in the conductive state when the ignition switch is closed. The thyristor further is conductive for one operation following opening of the ignition switch, while the transistor is conductive for a predetermined time period following opening of the ignition switch.

9 Claims, 2 Drawing Figures

CONTROL CIRCUIT FOR AN ELECTROMOTOR

BACKGROUND OF THE INVENTION

The present invention relates to switching circuits for the electromotor driving fan cooling an engine in a motor vehicle. Specifically, it relates to such circuits wherein a control circuit energizes the electromotor independently of the state of the ignition switch means when the temperature of the engine exceeds a predetermined temperature. The control circuit includes a thermostat which closes when the engine temperature exceeds said predetermined temperature.

In these known arrangements, the electromotor driving the fan can be energized whenever the engine temperature exceeds the predetermined temperature even when the ignition switch is open, since the energization of the electromotor is independent of the ignition switch. Thus the known arrangements effectively combat the condition wherein the motor temperature rises possibly over 120°C. after the engine has been shut off. This rise in temperature often resulted in as bubbles in the gas feed line which made the next starting operation of the motor extremely difficult. Further, the increase in temperature following the engine shut off used to result in steam bubbles in the cooling system and damage to other temperature sensitive elements within the engine, such as, for example, a bearing damage.

The known circuits prevent all the above damage since the fan continues to blow after the engine switch has been turned off. However, since the electromotor driving the fan is energized independently of the ignition circuit, these known systems allow the fan to be activated whenever ambient conditions such as, for example, strong sunlight, cause the motor temperature to rise above a predetermined temperature. Thus if the automobile is parked in a strong sunlight it is possible that the battery is worn out by the excessive use of the fan and that the next starting operation cannot be carried out.

SUMMARY OF THE INVENTION

It is an object of the present invention to modify the control circuit of a known system in such a manner that the above-mentioned wearing out of the battery cannot take place.

The present invention resides in a motor vehicle having an engine including an ignition circuit, a source of electric energy, ignition switch means having an activated and a de-activated state for, respectively, connecting and disconnecting said ignition circuit when said source of electrical energy, a fan for cooling said engine, an electromotor for driving said fan, and control circuit means for energizing said electromotor independently of said state of said ignition switch means when the temperature of said engine exceeds a predetermined temperature.

The present invention comprises limiting means connected to said control circuit means and said ignition switch means, for limiting the operation of said control circuit means to a predetermined time period or to a predetermined number of operations following switching of said ignition switch means from said activated to said de-activated state.

In a preferred embodiment of the present invention the control circuit is allowed to operate only one time after the ignition circuit has been di-activated so that the load on the battery is definitely limited. It has been shown, that after the ignition switch is deactivated, the engine temperature decreases rapidly when the fan is operating and can be brought beneath the predetermined temperature sufficiently rapidly to prevent excessive drain on the battery.

In a second embodiment, the control circuit is operative to energize the electromotor driving the fan only for a predetermined time period following the de-activation of the ignition switch means. It is well known that the rise in temperature due to heat stored during operation of the engine takes place very rapidly after the engine is shut off, so that any rise in temperature resulting from heat stored in the engine will take place within a predetermined relatively short time period following switching of the ignition switch means from the activated to the de-activated state.

When the operation of the control circuit is limited to a predetermined time period following the de-activation of the ignition circuit means, this allows the control circuit means to be operated as often as required during said predetermined time period and for as long a time period as required for each operation. Alternatively, it is of course possible to limit the time period for each operation of the control circuit independently.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
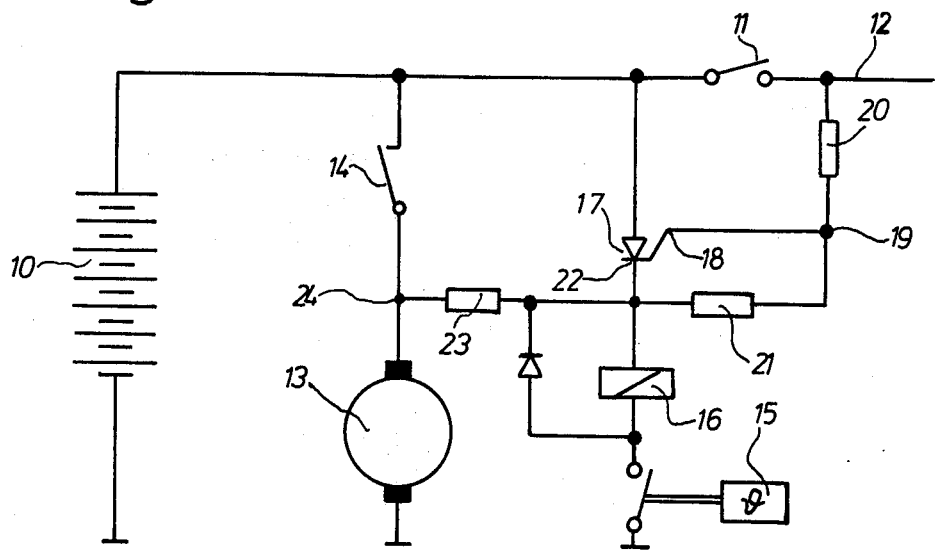
FIG. 1 shows an embodiment of the present invention which permits only a single operation of the control circuit means following switching of the ignition switch from the activated to the de-activated state.

The preferred embodiment of the present invention will now be described with reference to the drawing.

In both Figures, reference numeral 10 refers to the battery in the motor vehicle. The ignition switch in both Figures has reference numeral 11. The ignition switch 11 connects the ignition circuit, indicated only by a line 12 to battery 10 when closed (activated). An electromotor 13 for driving the fan for cooling the engine of the motor vehicle is connected in series with switch contact 14 which directly connects motor 13 to battery 10 when closed, independent of the state of the switch 11. The control circuit means for this embodiment comprise a thermostat 15 which, when closed, that is when the engine temperature exceeds a predetermined temperature, connects one side of a relay coil 16 to ground potential. Relay coil 16, when energized, closes contact 14. Relay coil 16, contact 14 and thermostat 15 constitute the control circuit means. Further, in both FIGS. 1 and 2, a limiting circuit means is present. In both cases this includes an electronic switch having a main conductive circuit connected in series with relay coil 16. The series circuit of the electronic switch and relay coil 16 as well as thermostat 15 is directly connected across battery 10 and therefore independent of the state of the ignition switch 11.

In the embodiment shown in FIG. 1, the electronic switch, 17, is a thyristor. Its anode-cathode circuit is connected in series with relay coil 16, while its gate, 18, is connected to the cap, 19, of a voltage divider including resistors 20, 21 which are connected from the ignition circuit line 12 to the cathode of thyristor 17. Cathode 22 of thyristor 17 is further connected to a resistor 23 to a terminal 24 which is the common point of electromotor 13 and switch contacts 14.

The embodiment shown in FIG. 1 operates as follows: After ignition switch 11 is closed, thyristor 17 is switched to the conductive state since a positive voltage exists at its anode, and a positive voltage relative to the cathode voltage also exists at gate 18. The voltage of cathode 22 is determined by a voltage division of the voltage furnished by battery 10 though resistors 20, 21, 23 and the internal resistance of motor 13 at standstill. However, it should be noted that the circuit components are so chosen that, under these conditions, the current through the anode-cathode circuit of thyristor 17 is relatively low, that is insufficient to cause motor 13 to operate.

If, with switch 11 still closed, thermostat 15 closes when the engine temperature exceeds a predetermined temperature, the circuit of relay coil 16 is closed energizing relay coil 16, closing contact 14, and therefore starting the operation of motor 13. The motor continues to run until the engine temperature is sufficiently decreased to cause thermostat 15 to open. At this point motor 13 is again de-activated. As long as switch 11 is closed, the process can be repeated any time that the motor temperature exceeds the predetermined temperature. However, let it now be assumed that switch 11 is opened causing the engine to stop. A low maintaining current still flows through the anode-cathode circuit of thyristor 17 so that this thyristor is still in a conductive state. When, however, thermostat 15 closes causing switch 14 to close, the thyristor is blocked since a sufficiently high positive voltage then appears at cathode 22 through closed contact 14 and resistor 23. Relay coil 16 remains energized through closed contacts 14, resistor 23 and closed thermostat 15 until such time as thermostat 15 again opens. After thermostat 15 again opens, thyristor 17 cannot be reignited since there is now no voltage present at its gate 18. Motor 13 can thus be energized only once after ignition switch 11 has been opened. Excess drain on the battery is prevented.

Figure 2:
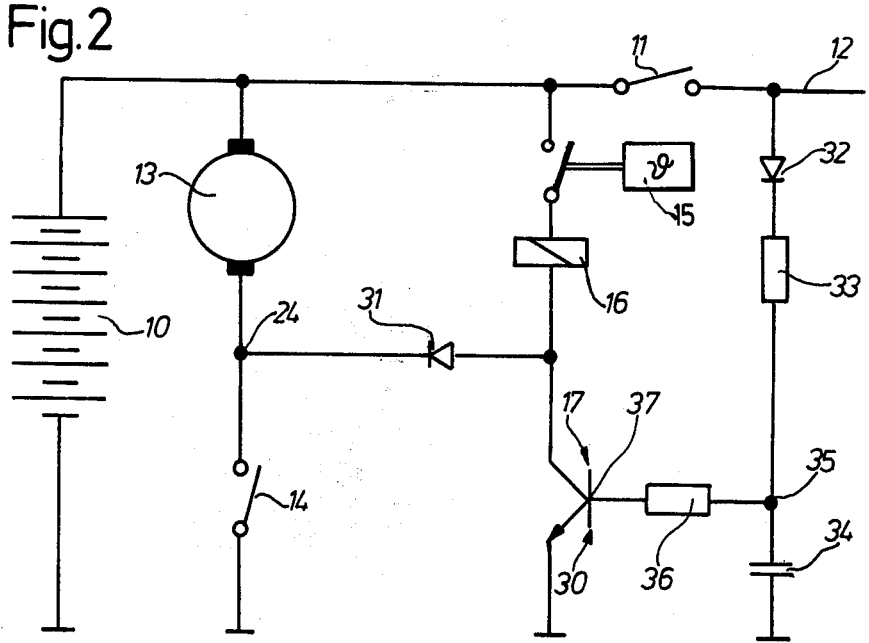
FIG. 2 is an embodiment of the present invention which permits operation of the control circuit means for a predetermined time period following the switching of the ignition switch means from the activated to the de-activated state.

In the embodiment shown in FIG. 2, the electronic switch is a transistor 40 whose emitter-collector circuit is connected from one terminal of relay coil 16 to ground potential. The collector of transistor 40 is further connected to the above-mentioned circuit point 24 through a diode 31. Further connected from line 12 to ground potential is a series circuit containing a diode 32, a resistor 33 and a capacitor 44. The common point of capacitor 34 and resistor 33, labeled 45, is connected to a resistor 46 to the base, 37, of transistor 30.

The arrangement of FIG. 2 operates as follows: When switch 11 is first closed, capacitor 34 charges through diode 32 and resistor 33. The potential at point 35 and therefore at the base of transistor 30 is thus a positive potential relative to ground and to the emitter of transistor 30. Diode 32 serves to prevent capacitor 34 from discharging through the ignition circuit when switch 11 is opened.

Transistor 30 is thus kept in a ready state by the positive voltage at its base and becomes conductive only when thermostat 15 closes since diode 31 prevents collector current from being drawn through motor 13.

As long as the ignition switch is closed, capacitor 34 remains fully charged and is thus always in a ready state.

However, after switch 11 is opened, capacitor 34 can discharge through resistor 36 (which is a high resistance resistor) and the base-emitter circuit of transistor 30. Thus transistor 30 remains in a ready state only as long as capacitor 34 remains charged. During this time, which in a preferred embodiment is approximately 4 minutes, a current can flow through the emitter-collector circuit of transistor 30 when thermostat 15 closes. Relay coil 16 is thus energized and contacts 14 are closed causing the electromotor and thus the fan to be activated. However after the discharge time of capacitor 44 has passed, the transistor is permanently blocked since its base is then at ground potential. It is thus impossible that motor 13 and the fan are operated following a predetermined time interval after the ignition switch has opened. This again prevents any excessive drain on the battery.

In the above circuitry transistor 37 and its associated base circuit constitute the limiting circuit means.

Two preferred embodiments of the present invention have been described. In the first, the number of operations following opening of the ignition switch is limited, while in the other the operating time during which additional fan operations can occur following the opening of ignition switch 11 is limited. Also, specific circuits for achieving these ends are disclosed. However, it will be noted that the present invention contemplates within its scope other circuits which may combine a timing and a number of operating times characteristic and of course other embodiments for limiting circuits will be readily apparent to one skilled in the art. These are to be included within the scope of the present invention.

Without further analysis, the foregoing will so fully reveal the gist of the present invention that others can, by applying current knowledge, readily adapt it for various applications without omitting features that, from the standpoint of prior art fairly constitute essential characteristics of the generic or specific aspects of this invention.

What is claimed as new and desired to be protected by Letters Patent is set forth in the appended claims:

1. In a motor vehicle having an engine including an ignition circuit, a source of electric energy, ignition switch means having an activated and a de-activated state for, respectively, connecting and disconnecting said ignition circuit from said source of electric energy, a fan for cooling said engine, an electromotor for driving said fan, and control circuit means for energizing said electromotor independently of said state of said ignition switch means when said temperature of said engine exceeds a predetermined temperature: limiting means connected to said control circuit means and said ignition switch means for limiting the operation of said control circuit to a predetermined time period or a predetermined number of times following switching of said ignition switch means from said activated to said de-activated state.

2. Apparatus as set forth in claim 1, wherein said control circuit means comprise a thermostat having a closed position for connecting said control circuit means to said source of electrical energy when said temperature of said engine exceeds said predetermined temperature.

3. Apparatus as set forth in claim 2, wherein said control circuit means further comprise additional switch means having an operative state connecting said electromotor to said source of electrical energy independent of said state of the ignition switch means, and switch control means connected to said thermostat for switching said additional switch means to said operative state when said thermostat is closed.

4. Apparatus as set forth in claim 3, and said switch control means comprise a relay coil and said additional switch means comprise relay contacts operative under control of said relay coil.

5. Apparatus as set forth in claim 3, wherein said limiting means comprises limiter switch means having a main conductive circuit connected to said source of electrical energy and said switch control means and a control electrode connected to said ignition switch means for allowing energization of said switch control means, and thereby of said electromotor when said ignition switch means is closed, and one time following switching of said ignition switch means from said activated to said de-activated state.

6. Apparatus as set forth in claim 5, wherein said limiter switch means comprise a thyristor having an anode-cathode circuit connected in series with said switch control means and a gate connected to said ignition switch means in such a manner that the voltage at said gate varies in dependence on the state of said ignition switch means.

7. Apparatus as set forth in claim 6, wherein said limiting means further comprise means for connecting said anode-cathode circuit of said thyristor to said electromotor in such a manner that a maintaining current flows through said thyristor when said electromotor is de-energized.

8. Apparatus as set forth in claim 3, wherein said limiting means comprise a transistor having an emitter-collector circuit connected in series with said control switch means and having a base, and timing circuit means interconnected between said base and said ignition switch means in such a manner that said emitter-collector circuit is conductive when said ignition switch means is in said activated state and for said predetermined time period following said switching of said ignition switch means from said activated to said deactivated state.

9. Apparatus as set forth in claim 8, wherein said timing circuit means comprise a resistor-capacitor circuit.

* * * * *